(12) United States Patent
Fabris et al.

(10) Patent No.: US 11,328,258 B2
(45) Date of Patent: May 10, 2022

(54) SYSTEM AND METHOD FOR ENTERPRISE-WIDE TRAVEL EMAIL FILTERING, PROCESSING, VISUALIZATION, AND DATA DISTRIBUTION

(71) Applicant: Traxo, Inc., Dallas, TX (US)

(72) Inventors: Andres Fabris, Dallas, TX (US); Christopher Stevens, Flower Mound, TX (US); Matthew Griffin, Dallas, TX (US)

(73) Assignee: Traxo, Inc., Dallas, TX (US)

( * ) Notice: Subject to any disclaimer, the term of this patent is extended or adjusted under 35 U.S.C. 154(b) by 201 days.

(21) Appl. No.: 16/114,837

(22) Filed: Aug. 28, 2018

(65) Prior Publication Data

US 2019/0066015 A1   Feb. 28, 2019

Related U.S. Application Data

(60) Provisional application No. 62/551,321, filed on Aug. 29, 2017.

(51) Int. Cl.
*G06Q 10/00*   (2012.01)
*G06Q 10/10*   (2012.01)
*G06Q 10/06*   (2012.01)

(52) U.S. Cl.
CPC ....... *G06Q 10/107* (2013.01); *G06Q 10/0635* (2013.01); *G06Q 10/0637* (2013.01); *G06Q 10/06311* (2013.01)

(58) Field of Classification Search
CPC ......... G06Q 10/06311; G06Q 10/0637; G06Q 10/107; G06Q 10/0635

(Continued)

(56) References Cited

U.S. PATENT DOCUMENTS

| 7,406,503 B1 * | 7/2008 | Little, II | G06Q 10/107 |
| | | | 709/206 |
| 10,897,444 B2 * | 1/2021 | Raviv | H04L 51/22 |
| 10,977,289 B2 * | 4/2021 | Grabovitch-Zuyev | |
| | | | G06N 20/00 |
| 2004/0044674 A1 * | 3/2004 | Mohammadioun | G06Q 10/10 |

(Continued)

OTHER PUBLICATIONS

H. Hong and T. -S. Moh, "Effective topic modeling foremail," 2015 International Conference on High Performance Computing & Simulation (HPCS), 2015, pp. 342-349, doi: 10.1109/HPCSim.2015.7237060. (Year: 2015).*

(Continued)

*Primary Examiner* — Rutao Wu
*Assistant Examiner* — Tyrone E Singletary

(57) ABSTRACT

A method includes receiving, at a service provider, each of multiple email messages from an email system of a company after the email system determines that each email message includes travel information associated with business travel of an employee of the company, wherein the company is a client or customer of the service provider. The method also includes parsing and filtering, by the service provider, each email message to obtain the travel information. The method also includes storing, by the service provider, the travel information in a data repository. The method also includes generating, by the service provider, one or more user or data interfaces associated with the travel information, wherein the one or more user or data interfaces are arranged as a travel information dashboard accessible to the company.

20 Claims, 4 Drawing Sheets

(58) Field of Classification Search
USPC .................................................. 705/7.13
See application file for complete search history.

(56) References Cited

U.S. PATENT DOCUMENTS

| | | | | |
|---|---|---|---|---|
| 2004/0088357 | A1* | 5/2004 | Harding | H04L 51/12 709/206 |
| 2006/0168046 | A1* | 7/2006 | Qureshi | H04L 51/22 709/206 |
| 2008/0319808 | A1* | 12/2008 | Wofford | G06Q 30/06 705/6 |
| 2011/0239160 | A1* | 9/2011 | Kirshenboim | G06Q 10/107 715/810 |
| 2013/0344896 | A1* | 12/2013 | Kirmse | G06F 16/9574 455/456.3 |
| 2015/0235166 | A1* | 8/2015 | Brady | G06Q 30/0635 705/330 |
| 2018/0219823 | A1* | 8/2018 | Mohan | H04L 51/22 |

OTHER PUBLICATIONS

"Mail flow rules in Exchange Server", Microsoft Corporation, Jul. 12, 2018, 9 pages.
"Set up routing for your domain or organization" Google, Inc., copyright 2018, 2 pages.
"Understanding Transport Rules", Microsoft Corporation, Jul. 22, 2014, 5 pages.
"Procedures for mail flow rules in Exchange Server", Microsoft Corporation, Jul. 8, 2018, 16 pages.
"Create a Mail Transport Rule to BCC Emails to Another Mailbox", BetterCloud Monitor, Mar. 18, 2015, 4 pages.
"Best practices for configuring mail flow rules", Microsoft Corporation, Jun. 22, 2018, 3 pages.
"Use mail flow rules to route email based on a list of words, phrases, or patterns", Microsoft Corporation, Jun. 22, 2018, 3 pages.
"Exchange Online Limits", Microsoft Corporation, Jul. 12, 2018, 30 pages.
"Exchange Online PowerShell", Microsoft Corporation, Feb. 19, 2018, 1 page.
"Mail flow rule conditions and exceptions (predicates) in Exchange Online", Microsoft Corporation, Jul. 10, 2018, 26 pages.
"Import-TransportRuleCollection", Microsoft Corporation, copyright 2018, 7 pages.
"Use transport rules to configure bulk email filtering", Microsoft Corporation, Dec. 19, 2017, 4 pages.
"Configure mail flow using connectors in Office 365", Microsoft Corporation, Jun. 22, 2018, 8 pages.

* cited by examiner

SYSTEM AND METHOD FOR ENTERPRISE-WIDE TRAVEL EMAIL FILTERING, PROCESSING, VISUALIZATION, AND DATA DISTRIBUTION

CROSS-REFERENCE TO RELATED APPLICATION AND PRIORITY CLAIM

This application claims priority under 35 U.S.C. § 119(e) to U.S. Provisional Patent Application No. 62/551,321, which was filed on Aug. 29, 2017. This provisional application is hereby incorporated by reference in its entirety.

TECHNICAL FIELD

The present disclosure relates to a system and method for enterprise-wide travel email filtering, processing, visualization, and data distribution.

BACKGROUND

Many business enterprises (companies, corporations, etc.) have employees who travel for business, and send and receive email messages associated with business travel using their employee email address. Due to the proliferation of travel booking sites on the Internet, it is easier than ever for a person (e.g., an employee of the company) to book travel reservations independently and without direct knowledge of the employer. However, employer knowledge of the travel information may be helpful or necessary to comply with business interests (e.g., scheduling of employees, adherence to a company travel policy, budgets, duty-of-care considerations, and the like). Thus, it would be helpful to identify, filter, process, and handle travel information of an employee that is contained in email messages sent or received by the enterprise email system.

SUMMARY

This disclosure provides a system and method for enterprise-wide travel email filtering, processing, visualization, and data distribution.

In a first embodiment, a method includes receiving, at a service provider, each of multiple email messages from an email system of a company after the email system determines that each email message includes travel information associated with business travel of an employee of the company, wherein the company is a client or customer of the service provider. The method also includes parsing and filtering, by the service provider, each email message to obtain the travel information. The method also includes storing, by the service provider, the travel information in a data repository. The method also includes generating, by the service provider, one or more user or data interfaces associated with the travel information, wherein the one or more user or data interfaces are arranged as a travel information dashboard accessible to the company.

In a second embodiment, a system of a service provider includes at least one memory, and at least one processor coupled to the at least one memory. The at least one processor is configured to: receive each of multiple email messages from an email system of a company after the email system determines that each email message includes travel information associated with business travel of an employee of the company, wherein the company is a client or customer of the service provider; parse and filter each email message to obtain the travel information; store the travel information in a data repository; and generate one or more user or data interfaces associated with the travel information, wherein the one or more user or data interfaces are arranged as a travel information dashboard accessible to the company.

In a third embodiment, a non-transitory computer readable medium embodies a computer program. The computer program comprises computer readable program code for: receiving, at a service provider, each of multiple email messages from an email system of a company after the email system determines that each email message includes travel information associated with business travel of an employee of the company, wherein the company is a client or customer of the service provider; parsing and filtering, by the service provider, each email message to obtain the travel information; storing, by the service provider, the travel information in a data repository; and generating, by the service provider, one or more user or data interfaces associated with the travel information, wherein the one or more user or data interfaces are arranged as a travel information dashboard accessible to the company.

Other technical features may be readily apparent to one skilled in the art from the following figures, descriptions, and claims.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, in which.

DETAILED DESCRIPTION

The figures discussed below and the various embodiments used to describe the principles of the present disclosure are by way of illustration only and should not be construed in any way to limit the scope of the disclosure. Those skilled in the art will understand that the principles of the disclosure may be implemented in any suitably arranged system.

Embodiments of the present disclosure provide an enterprise email parsing and filtering system and method for identifying, filtering, processing, and handling travel related emails that are associated with employees of a corporation, company, business enterprise, other business entity, university, affiliate group, or organization (hereinafter referred to simply as a "company"). The enterprise email parsing and filtering system and method described in this disclosure is comprised of proprietary rule sets that operate in conjunction with a company email system infrastructure and email parsing system infrastructure. Certain functions of the system and method can operate as a customer facing service of a service provider.

While the term "employee" may refer to an actual employee of a company, this disclosure is not limited thereto. As used herein, "employee" may also refer to a contractor, freelancer, vendor, supplier, temporary worker, student, member, or any other individual or group that has an association with a company and may book travel related to its association with the company.

Figure 1:
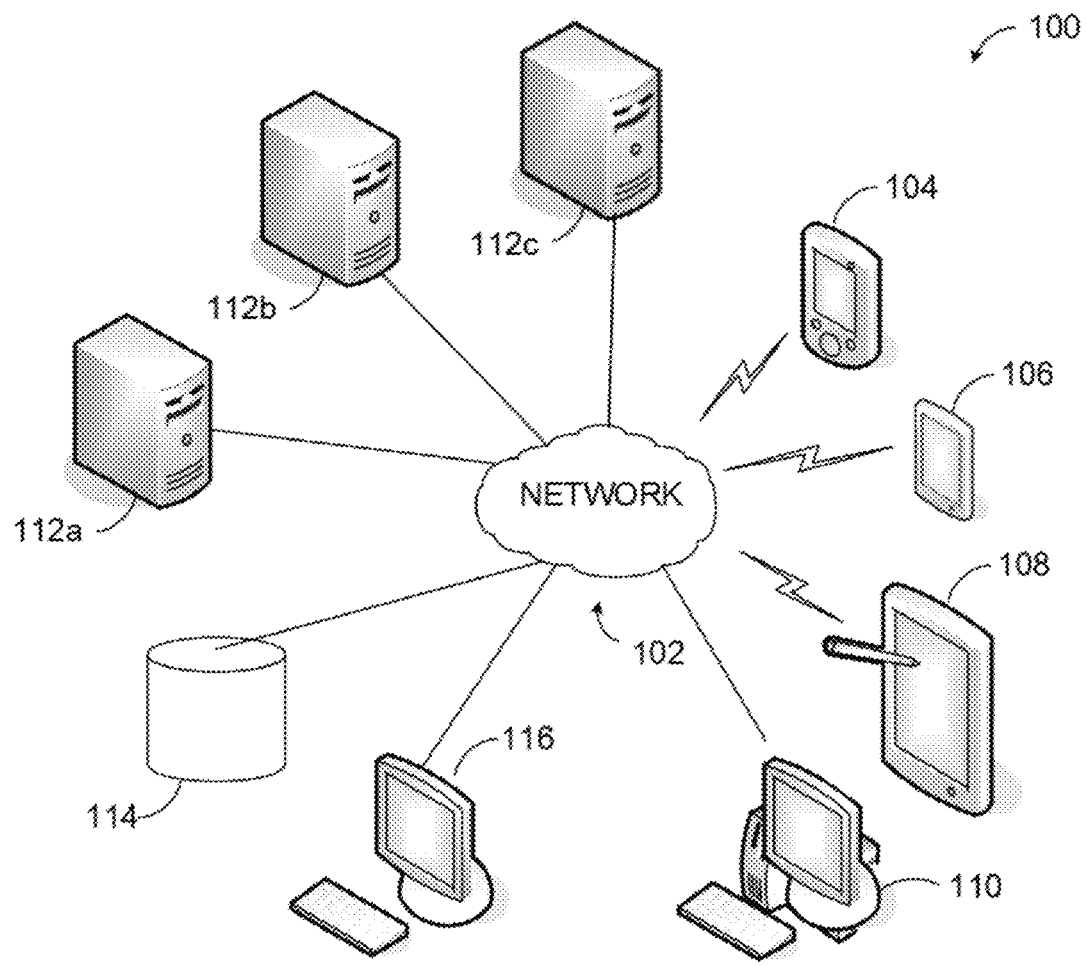
FIG. 1 illustrates an example system for filtering, processing, visualization, and data distribution of travel-related emails in accordance with this disclosure.

FIG. 1 illustrates an example system 100 for filtering, processing, visualization, and data distribution of travel-related emails in accordance with this disclosure. For example, all or portions of the system 100 can be used for identifying, filtering, processing, and handling travel related emails that are associated with a company. The embodiment illustrated in FIG. 1 is for illustration only. Other embodiments could be used without departing from the scope of this disclosure.

As shown in FIG. 1, the system 100 includes a network 102. The network 102 generally represents a communication network or combination of communication networks facilitating communication between different devices or systems. Each network 102 provides any suitable communication links, such as wired, wireless, fiber optic links, or the like. In particular embodiments, the network 102 includes a combination of networks, such as the Internet, one or more cellular communication networks, and one or more local or wide area networks (which could support wired or wireless communications).

Multiple end user devices 104-110 communicate via the network 102. The user devices 104-110 generally denote devices used for making, receiving, processing, or interpreting travel reservation information as described in greater detail below. The user devices 104-110 include fixed or mobile devices that communicate over wired, wireless, or other connections with at least one of the networks 102. In this example, the user devices 104-110 include a personal digital assistant 104, a smartphone 106, a tablet computer 108, and a desktop or laptop computer 110. Any other or additional user devices can be used in the system 100, and the system 100 can support interaction with any number of user devices.

Multiple servers 112a-112c also communicate over the network 102. Each server 112a-112c represents a computing device that processes information associated with identifying, filtering, processing, and handling travel related emails that are associated with a company. Information associated with the operations of the servers 112a-112c is stored in one or more related databases 114. For example, each server 112a-112c receives, updates, or processes information associated with one or more travel email records, such as a hotel reservation, an airplane reservation, or a car rental reservation. As a particular example, at least one server 112a can represent a company's corporate email server that is configured with rules associated with filtering travel email records. Another server 112b can represent a data processing server of a service provider that parses travel information from travel email records and stores the travel information in the database 114. Still another server 112c can extract travel information from the database 114 and deliver the travel information to a client device (such as one of the user devices 104-110) via an API (application programming interface). In some embodiments, multiple ones of these functions could be performed by a common server. Different information or additional information can also be provided by each server 112a-112c. Each server 112a-112c includes any suitable structure for providing information and interacting with user devices. The database 114 includes any suitable structure for storing information and for facilitating retrieval of information.

One or more operator stations 116 are capable of interacting with the servers 112a-112c. For example, an operator station 116 allows an operator to make, receive, process, review, or interpret travel reservation information as described in greater detail below. Each operator station 116 includes any suitable structure supporting interaction with a server, such as a desktop computer, laptop computer, dumb terminal, or mobile device.

As described herein, each user device 104-110 and operator station 116 executes an application or accesses an application executed by one or more of the servers 112a-112c. The application allows a user to interact with, receive information from, and provide information to, the server(s) 112a-112c. For example, the server(s) 112a-112c can receive requests from the user devices 104-110 or operator station 116 and, in response to receiving requests from the user devices 104-110 or operator station 116, provide information from the database 114. Other operations supported by the application are described herein.

In some embodiments, different components of the system 100 may be owned or operated by different entities, such as different business entities. For example, one or more user devices 104-110, servers 112a-112c, databases 114, and operator stations 116 may comprise components of a company system that sends and receives travel-related emails. In addition, one or more other user devices 104-110, servers 112a-112c, databases 114, and operator stations 116 may comprise components of a service provider that analyzes, filters, stores, and processes data associated with the travel-related emails of the company, which is a client or customer of the service provider. Data associated with the travel-related emails can be exchanged between the components of the company system and the components of the service provider as needed to fulfill the services of the service provider requested by the company client.

Although FIG. 1 illustrates one example of a system 100 for identifying, processing, and handling travel reservations, various changes may be made to FIG. 1. For example, various components in FIG. 1 could be combined, further subdivided, rearranged, or omitted and additional components could be added according to particular needs.

Figure 2:
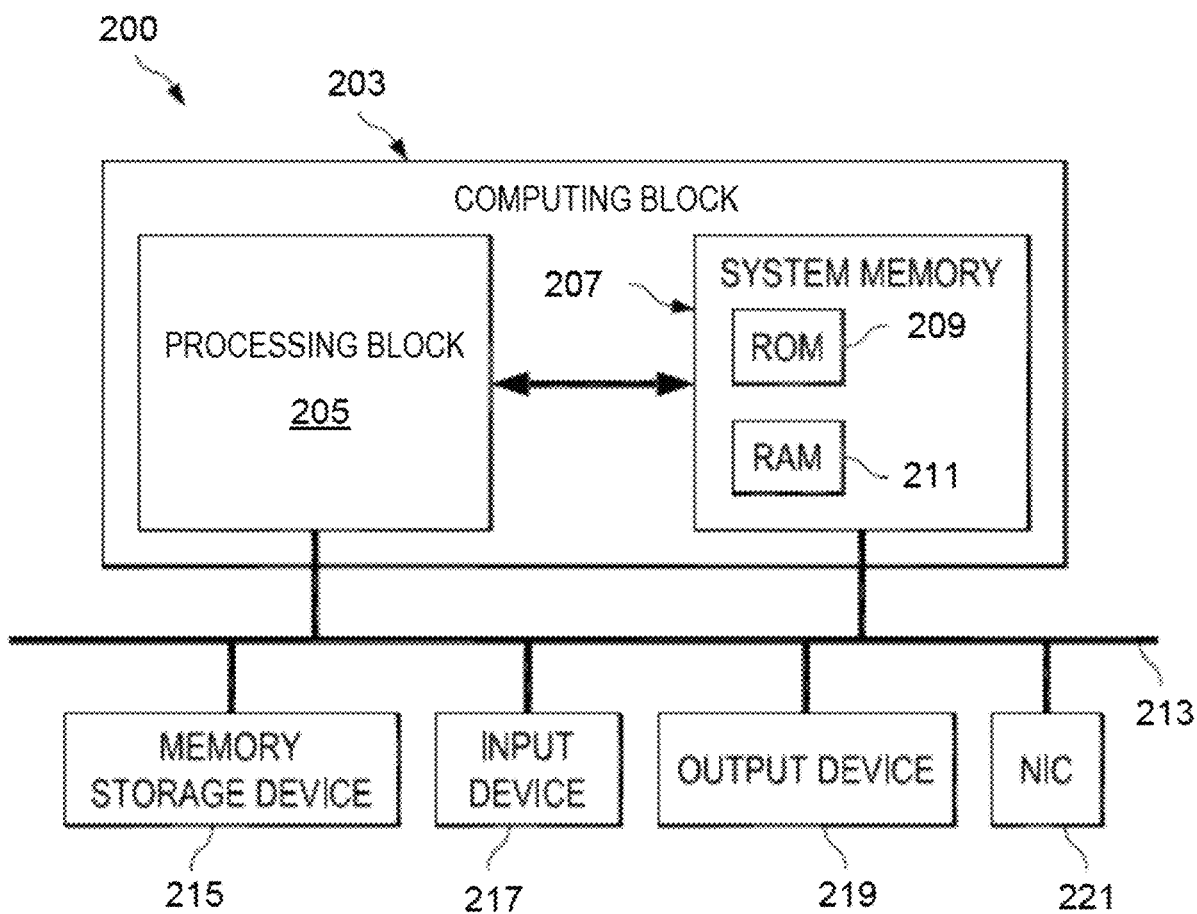
FIG. 2 illustrates an example computing device for filtering, processing, visualization, and data distribution of travel-related emails in accordance with this disclosure.

FIG. 2 illustrates an example of a computing device 200 for filtering, processing, visualization, and data distribution of travel-related emails in accordance with this disclosure. The computing device 200 can be used in the system 100. For example, the computing device 200 can represent any of the components 104-112c and 116 in FIG. 1. In general, the methods disclosed herein may be performed using a parallel computing platform comprising a plurality of computing nodes, such as a data center that includes multiple servers connected by a network. Each computing node may be represented by one computing device 200. The parallel computing platform may have as few or as many computing nodes (e.g., computing devices 200) as needed to perform the disclosed methods.

As shown in FIG. 2, the computing device 200 includes a computing block 203 with a processing block 205 and a system memory 207. The processing block 205 may be any type of programmable electronic device for executing software instructions, but will conventionally be one or more microprocessors. The system memory 207 may include both a read-only memory (ROM) 209 and a random access memory (RAM) 211. As will be appreciated by those of skill in the art, both the read-only memory 209 and the random access memory 211 may store software instructions for execution by the processing block 205.

The processing block 205 and the system memory 207 are connected, either directly or indirectly, through a bus 213 or alternate communication structure, to one or more peripheral devices. For example, the processing block 205 or the system memory 207 may be directly or indirectly connected to one or more additional memory storage devices 215. The memory storage devices 215 may include, for example, a "hard" magnetic disk drive, a solid state disk drive, an optical disk drive, and a removable disk drive. The processing block 205 and the system memory 207 also may be directly or indirectly connected to one or more input devices 217 and one or more output devices 219. The input devices 217 may include, for example, a keyboard, a pointing device (such as a mouse, touchpad, stylus, trackball, or j oystick), a touch screen, a scanner, a camera, and a microphone. The output devices 219 may include, for example, a display device, a printer and speakers. Such a display device may be configured to display video images. With various examples of the computing device 200, one or more of the peripheral devices 215-219 may be internally housed with the computing block 203. Alternately, one or more of the peripheral devices 215-219 may be external to the housing for the computing block 203 and connected to the bus 213 through, for example, a Universal Serial Bus (USB) connection or a digital visual interface (DVI) connection.

With some implementations, the computing block 203 may also be directly or indirectly connected to one or more network interfaces cards (NIC) 221, for communicating with other devices making up a network. The network interface cards 221 translate data and control signals from the computing block 203 into network messages according to one or more communication protocols, such as the transmission control protocol (TCP) and the Internet protocol (IP). Also, the network interface cards 221 may employ any suitable connection agent (or combination of agents) for connecting to a network, including, for example, a wireless transceiver, a modem, or an Ethernet connection.

It should be appreciated that the computing device 200 is illustrated as an example only, and it not intended to be limiting. Various embodiments of this disclosure may be implemented using one or more computing devices that include the components of the computing device 200 illustrated in FIG. 2, or which include an alternate combination of components, including components that are not shown in FIG. 2. For example, various embodiments may be implemented using a multi-processor computer, a plurality of single and/or multiprocessor computers arranged into a network, or some combination of both.

In accordance with this disclosure, email messages that are received by a company email system are evaluated against one or more rule sets upon receipt by the company email server. Messages matching a filter rule are automatically forwarded by the company email server to a service provider for email parsing (a copy of the email message continues on to its intended recipient). The service provider parses the email for travel related information, extracts the travel related information to associate the information with an employee and one or more travel records, and stores the information for use by the company client, a third-party travel information stakeholder, or both.

Figure 3:
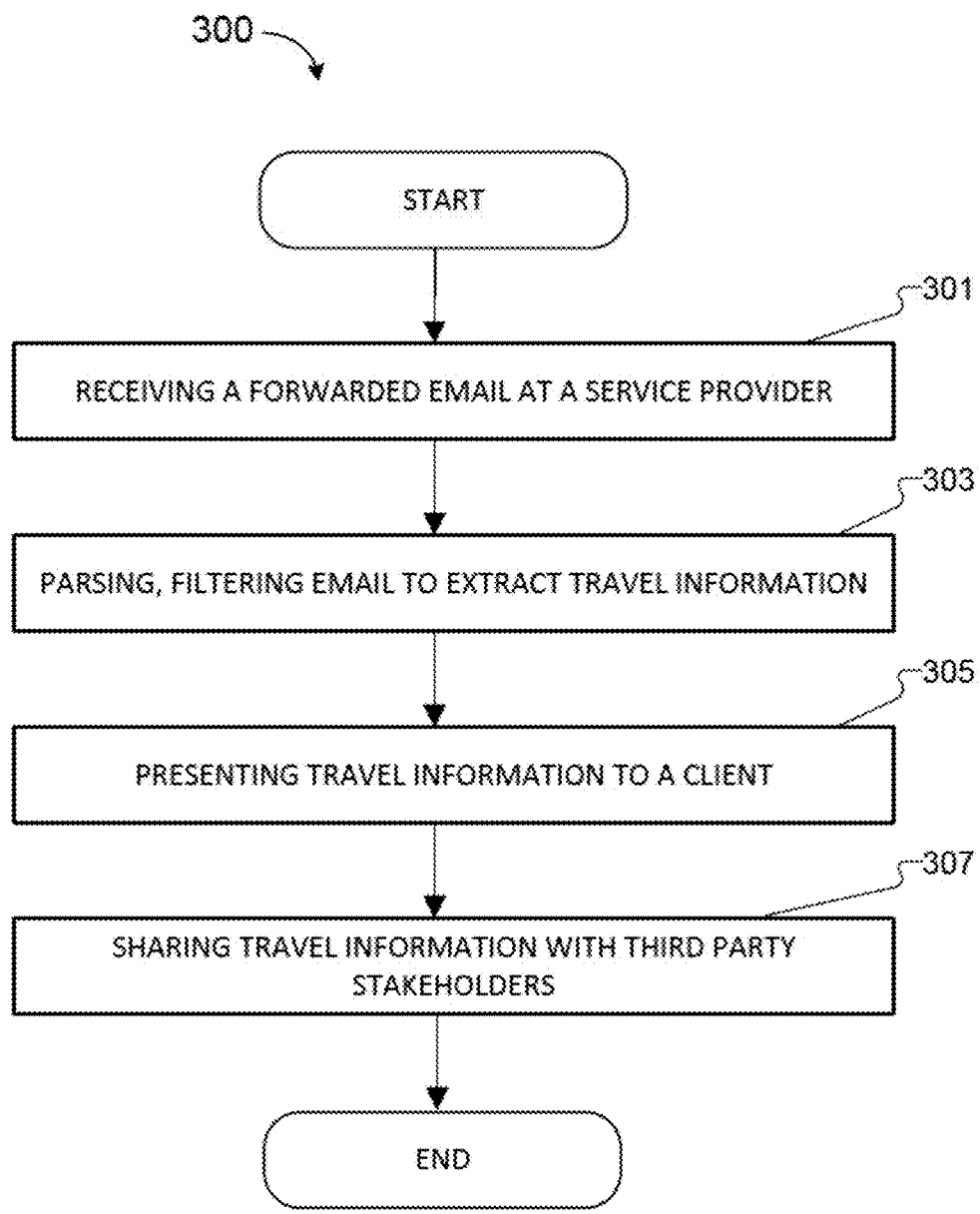
FIG. 3 illustrates an example method for filtering, processing, visualization, and data distribution of travel-related emails in accordance with this disclosure.

FIG. 3 illustrates an example method 300 for filtering, processing, visualization, and data distribution of travel-related emails in accordance with this disclosure. While the method 300 is described with respect to travel-related emails, it will be understood that the same or a similar method may be used for emails containing other types of information. The method 300 may be performed by one or more components of the system 100 of FIG. 1, which may include a computing device, such as the computing device 200 of FIG. 2.

Initially, at operation 301, a travel-related email is received or sent through the company email system and is associated with an employee of the company. For example, an employee may receive, at the employee's work email address, an email confirming a hotel reservation made by the employee. The email message is intercepted by, or flows through, or lands on the company's corporate email server 112a, and the email server 112a applies one or more rules to the email message to determine that the email is travel-related. For example, the email server 112a can determine that the email contains hotel reservation or hotel folio information by using a keyword based filter rule that searches for specific text in the email (e.g., "check-in date" or "room type" or "Marriott"). In some embodiments, the email server 112a can determine that the email contains travel information based on the domain or email address of the sender (e.g., an email from Reservations@HotelChain.com), the email headers, the email subject line, or any combination of two or more of these.

If, by using the corporate filter rule set, the company email server 112a determines that the email is travel related, the company email server 112a forwards the email to a client-specific mailbox operated by the service provider. A server 112b at the service provider then receives the forwarded email.

At operation 303, the service provider server 112b parses the forwarded email to extract any travel related information contained in the email, and stores the travel related information in one or more databases 114 operated by the service provider.

To extract the travel related information, the server 112b operated by the service provider may examine and parse information in the email record (e.g., text within the body of the email, a document attached to or referenced by the email, metadata of the email, etc.). For example, a parsing engine in the server 112b may parse the email record to determine the existence of one or more text strings or keywords associated with a travel record. Representative text strings may include "Departure time", "Check-in date", "Reservation number", "Cost per night", and the like. Then, the server 112b interprets the identified text strings or keywords to determine the travel information.

The server 112b parses all travel-related data from the email, including the contents of any attachments to the email. For example, the server 112b can parse the contents of a post-checkout folio document that is attached to (or referenced by) the check-out email from a hotel. Parsing the folio document attached to (or referenced by) the email allows the acquisition of actual charge information (including all taxes and incidental charges, such as meals, movie rentals, dry cleaning, etc.) rather than just reservation quotes or estimates. In some cases, the actual charges can be compared with estimated charges or reservation quotes to look for discrepancies between the two.

Each email and its travel related contents are associated with an employee of the company. Each employee is set up with a travel itinerary and an identifier in the service provider's database 114. As new emails are processed by the server 112b, the travel information is associated with an employee and stored in the database 114 as part of the employee's master itinerary or "global PNR." If an email is received that contains travel information for an employee or from an email address that is not set up in the service provider's database 114, then a new employee folio and identifier can be set up.

The disclosed system and method are compatible with multiple email solutions, including various versions and implementations of MICROSOFT EXCHANGE and GOOGLE G SUITE. For MICROSOFT EXCHANGE environments, the rule sets are typically, but not exclusively, configured and provided as "Transport Rules" or "Flow Rules." For GOOGLE G SUITE environments, the rule sets are typically, but not exclusively, configured and provided as "Content Compliance" rules. For environments using other email solutions, the rule sets can be customized or configured according to the parameters of such email solutions.

The service provider is responsible for maintaining the rule sets and providing up-to-date rules sets to its company clients. For example, rule sets may be sent from the server 112b of the service provider to the email server 112a of the company on a scheduled or ad hoc basis. The rule sets are developed initially by analyzing the content or metadata of previously processed messages in aggregate within the system. Rules can be classified by type (e.g., 'Airline', 'Car Rental', 'Hotel', 'OTA', 'Other', etc.). This allows for targeted application of rules for particular business purposes. Rules may be prioritized across a plurality of metrics including, but not limited to, frequency of occurrence, regional or geopolitical preferences, company preferences, or factors relating to the safety or security of company assets and personnel. Rule set maintenance is performed continuously as each message completes the parsing process. If the message content or metadata does not match any existing rule, the message can be added to a work queue for subsequent analysis.

Each company client of the service provider may provide their own rules to be added to the rule set on a per-account and/or per-mailbox basis. In some embodiments, the company client can set up a white list of always-acceptable email addresses, domain names, employee names, record types, etc., or a black list of forbidden email addresses, domain names, employee names, record types, etc. As a particular example, a company client may wish to ignore airplane reservations from a subscription-based or fractional ownership airline or bookings made by that corporation's travel agency of record. Such rules can be evaluated by the company email server 112a or the service provider server 112b prior to the system-wide rules and may specify either "Allow" or "Deny" actions.

The rules for identifying, forwarding, and parsing emails are adaptable to account for the needs and interests of different company clients and to account for evolving travel information factors. For example, a new travel services provider (e.g., a new hotel chain or airline) may result in a new email domain name that should be searched for when an email is received.

The rules for identifying, forwarding, and parsing emails are also adaptable to account for limitations of the email system. For example, some email platforms have limits on the number of filters or filter terms that can be applied (e.g., a maximum of one thousand filters or filter terms). To maintain adherence to the limit, possible filter terms can be ranked and the top rankers up to the limit can be used. For example, rather than having one filter for the email address "Bookings@HotelChain1.com" and a separate filter for the email address "Bookings@HotelChain2.com," one rule can look for the string "Bookings@," which can be coupled with any domain. This reduces the number of filters that must be maintained and applied.

Email messages originating from consumer email services, non-supplier domains, marketing and newsletter senders, and the like, are typically removed from consideration based on message metadata and contents. Then, metadata from the remaining messages is aggregated. Senders with the highest volume that also meet a minimum threshold of activity are added to a work queue as a "rule candidate" for analysis.

For each rule candidate in the work queue, a decision is made to add the candidate to the rule set or remove it from current and future consideration. Dismissed rule candidates may be added back to the work queue automatically after a period of time if sufficient volume is detected by the system.

Rule candidate evaluation is performed using a number of techniques to identify the candidate as a valid originator of travel itinerary emails directed to an individual traveler. For example, a human operator may manually visit a web site or home page of the domain indicated by the address. As another example, an automated process may look up the address or domain in a registry. As yet another example, an automated process may scan public content found on the domain for travel-related keywords.

Messages submitted by manual user action within an email client application (forwarding, etc.) may be given higher priority during the evaluation process than an automated process like corporate email domain filtering.

Rule statistics and performance are monitored over time, and the resulting set of rules can change over time. Accordingly, the service provider can provide an updated version of the rules to each company client as rules are changed. This can be performed globally to all company clients as a new version release, or be performed in a more targeted way to a subset of company clients that are impacted by the rule changes. In some embodiments, the company client can receive a notification that a new rule set is available, and a representative of the company client (e.g., an IT employee) can download and implement the new rule set from the service provider's database 114.

In some embodiments, travel-related data may additionally or alternatively be received from a source other than an email. For example, the service provider (e.g., the email server 112b) can receive an indication of travel information (e.g., hotel reservation or hotel folio information) through an API (application programming interface), as a blind copy email from a travel supplier, or by aggregating the reservation from data feeds or websites associated with a travel supplier, with an on-line travel service, or with a traditional travel agency. In some embodiments, the travel information could be pulled from an employee's electronic work calendar. Also, in some embodiments, a reservation confirmation could be received via text message.

Once the travel related information is received and stored by the service provider, then at operation 305, the service provider (using, e.g., the server 112c) can query the travel related information and present the information in a number of formats at one or more user interfaces or data interfaces in order to provide useful reports to personnel at the company client. The user interfaces, data interfaces, and reports can be accessed remotely via a "dashboard" embodied in a website, a client application (an "app"), or another suitable user application.

Figure 4:
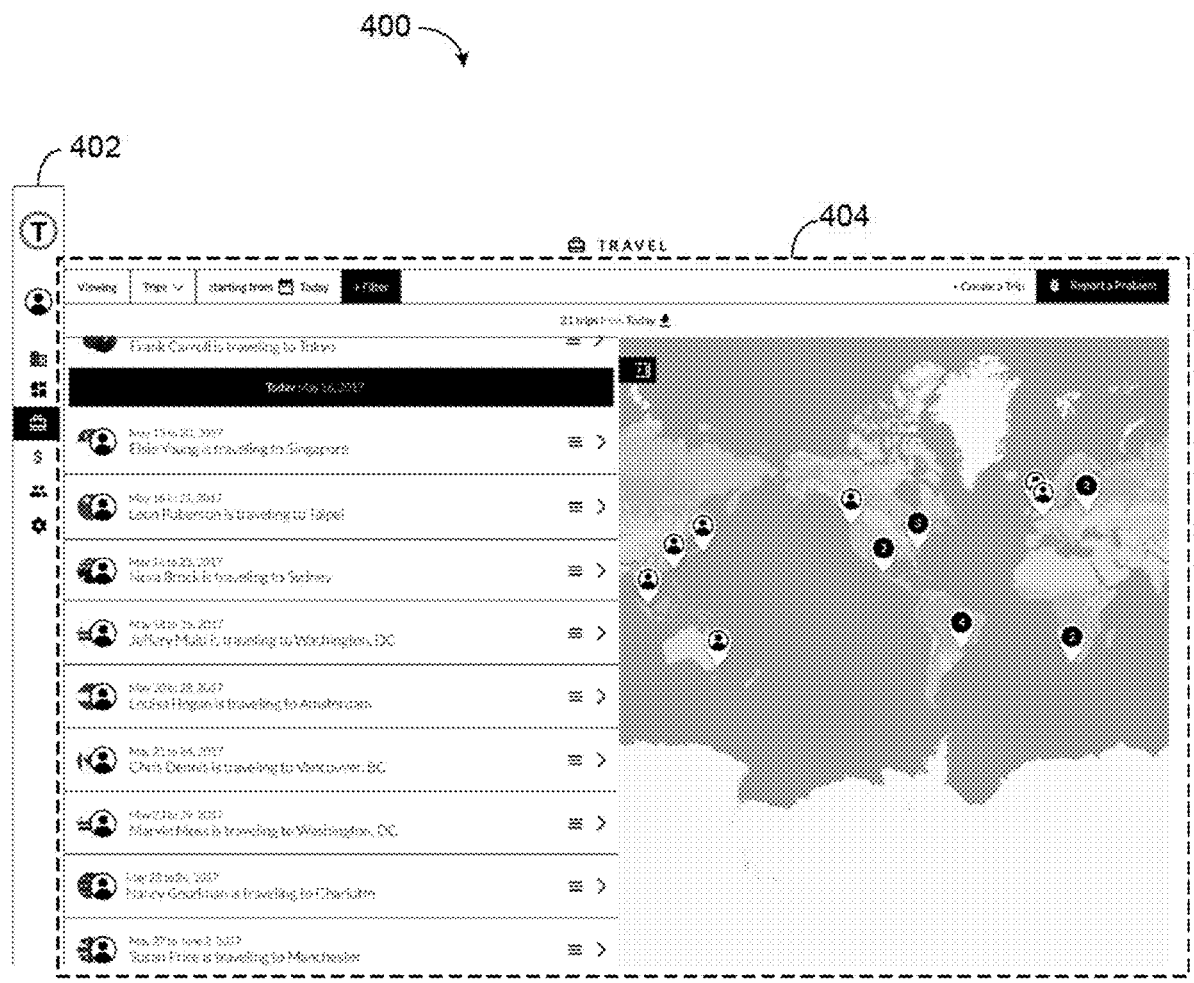
FIG. 4 illustrates an example dashboard in accordance with this disclosure.

FIG. 4 illustrates an example dashboard 400 in accordance with this disclosure. The dashboard 400 is a visualization tool that allows a client user to quickly and easily review and use the travel information. The dashboard 400 can organize and display the travel information in multiple ways that are useful to the company client.

The client-facing user interface of the dashboard 400 shown in FIG. 4 is accessible by the company client via a web browser or app that is launched on a computing device (e.g., one of the user devices 104-110 or operator station 116) by the company client. The engine of the dashboard 400 is hosted, operated, and maintained by the service provider. For example, the server 112b or the server 112c can execute the engine of the dashboard 400.

The dashboard 400 includes a top-level application navigation ribbon 402 on the left side of the user interface and a data display area 404 to the right of the navigation ribbon 402. The navigation ribbon 402 includes user actionable controls for accessing options such as Trips, Reports, Members, and Settings The Trips option provides a detailed view of individual trip information (e.g., flights, hotels, etc.) for travelers. As one example, the Trips option can provide an itinerary mode that generates an itinerary of a business trip of an employee. The trip records could be selected from the database and logically ordered (e.g., in chronological order) and include one or more transportation reservations, hotel reservations, dinner reservations, appointments, leisure activities, and any other records associated with the business trip.

The Reports option allows a company client user to browse and export reports of the company client's travel activity and expenditures. For example, the Reports option may offer financial views or reports for accounting or finance departments of the company client. Such financial reports may aggregate and display cost information associated with travel records in order to facilitate the generation of an expense report for the employee's business trip, or to determine, e.g., how much all employees of a department are spending on airfare.

The Member option is selected to allow a company client user to manage the company's employees in the system. Employees and employee information can be added, deleted, updated, or queried using multiple filters and search options. The employee information can include information associated with travel, such as frequent flyer number, affinity memberships, travel credit card information, travel preferences, and the like.

The Settings option allows a company client user to manage the settings of the dashboard 400 (e.g., team names, mailboxes, API credentials, reporting settings, client-specific email rules and filters, and the like). Changes to the settings allow the client user to customize the dashboard 400 to enhance user satisfaction and efficiency.

The data display area 404 of the dashboard 400 can show a variety of travel information, depending on the option(s) selected by the user. In FIG. 4, the data display area 404 shows a summary of recent booking or traveling activity by employees of the company. In some embodiments, a "Where Are My Employees Now?" report or map includes markers showing the current location of employees. Some companies may use this information to perform duty of care by knowing where employees are or will be. For example, a corporate security department may use this information to find which employees are in dangerous areas of the world. Employee travel records accessed or shown at the dashboard 400 could be integrated with real-time travel data (e.g., airline flight status information) to more accurately locate employees that are scheduled to be traveling at a particular date or time. This information may be particularly useful in a time of crisis. In general, the data display area 404 can display other views or reports that are related to the travel of the employees. Each company client can customize or add views and reports to better suit their business needs.

At operation 307, one or more travel records, reports, or associated data are pushed to, or shared with, other third-party travel-related stakeholders, such as expense reporting services (such as CHROME RIVER), providers (duty of care or risk management providers, such as iJET or WORLDAWARE) that oversee employee whereabouts (with a goal of keeping them safe), price assurance managers, providers that track and refund VAT taxes, travel analytics services (e.g., TABLEAU SOFTWARE), and the like. The company can select one or more of these stakeholders to receive the information, and then the service provider initiates sharing the information with them on a predetermined schedule or on a per-request basis. This information can be transmitted over one or more networks using one or more suitable protocols. In some embodiments, the information is transferred using APIs at either or both ends of the communication.

Although FIG. 3 illustrates one example of a method 300 for filtering, processing, visualization, and data distribution of travel-related emails, various changes may be made to FIG. 3. For example, various operations shown in FIG. 3 could overlap, occur in parallel, occur in a different order, or occur multiple times. Moreover, some operations could be combined or removed and additional operations could be added.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. A controller may be implemented in hardware or a combination of hardware and software/firmware. The functionality associated with any particular controller may be centralized or distributed, whether locally or remotely.

The phrase "at least one of," when used with a list of items, means that different combinations of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without is departing from the spirit and scope of this disclosure, as defined by the following claims.

What is claimed is:

1. A method comprising:
generating, by a server of a service provider, multiple email rule sets for multiple companies, wherein each email rule set enables an email server of each company to determine whether email messages processed by the email server include travel information associated with business travel of employees of that company, wherein each company is a client or customer of the service provider;
adapting, by the server of the service provider, a first one of the email rule sets based on a technical limitation of a first email platform, and adapting a second one of the email rule sets based on a technical limitation of a second email platform that is different from the first email platform;
sending, by the server of the service provider, the first email rule set to a first one of the companies and sending the second email rule set to a second one of the companies, wherein the first and second companies use different email platforms;
receiving, at the server of the service provider, each of multiple email messages from the email server of the first company via a network, wherein each email message is received after the email server determines, using the first email rule set, that the email message includes travel information associated with business travel of an employee of the first company;
parsing and filtering, by the server of the service provider, each email message to obtain the travel information;
storing, by the server of the service provider, the travel information in a data repository managed by the service provider;
generating, by the server of the service provider, one or more user interfaces associated with the travel information, wherein the one or more user interfaces are arranged as a travel information dashboard accessible to the first company;
sending, by the server of the service provider, the one or more user interfaces to a user device of the first company via the network, wherein the one or more user interfaces are displayed via a web browser or application disposed on the user device;
receiving, at the server of the service provider, at least one company-specific email rule generated at the user device using the one or more user interfaces;
updating, by the server of the service provider, the first email rule set based on the at least one company-specific email rule; and
sending, by the server of the service provider, at least a portion of the travel information to one or more third-party travel-related stakeholders associated with the first company via the network.

2. The method of claim 1, wherein the one or more third-party travel-related stakeholders associated with the first company comprise at least one of: an expense reporting service, a duty of care provider, a risk management provider, a price assurance manager, or a travel analytics service.

3. The method of claim 1, wherein the one or more user interfaces comprise at least one report generated using the travel information, the at least one report comprising at least one of: a travel expense report, a travel itinerary report, or an aggregate company employee travel report.

4. The method of claim 1, wherein parsing and filtering each email message comprises parsing and filtering contents of a document attached to or referenced by the email message.

5. The method of claim 1, wherein the one or more user interfaces comprise an aggregate company employee travel report generated using the travel information.

6. The method of claim 1, wherein the at least one company-specific email rule is generated after a user inputs information about the at least one company-specific email rule at the user device.

7. The method of claim 1, wherein the travel information dashboard comprises a navigation ribbon and a data display area.

8. A system of a service provider, the system comprising:
at least one memory; and
at least one processor coupled to the at least one memory, the at least one processor configured to:
generate multiple email rule sets for multiple companies, wherein each email rule set enables an email server of each company to determine whether email messages processed by the email server include travel information associated with business travel of employees of that company, wherein each company is a client or customer of the service provider;
adapt a first one of the email rule sets based on a technical limitation of a first email platform, and adapting a second one of the email rule sets based on a technical limitation of a second email platform that is different from the first email platform;
send the first email rule set to a first one of the companies and send the second email rule set to a second one of the companies, wherein the first and second companies use different email platforms;
receive each of multiple email messages from the email server of the first company via a network, wherein each email message is received after the email server determines, using the first email rule set, that the email message includes travel information associated with business travel of an employee of the first company;

parse and filter each email message to obtain the travel information;

store the travel information in a data repository managed by the service provider;

generate one or more user interfaces associated with the travel information, wherein the one or more user interfaces are arranged as a travel information dashboard accessible to the first company;

send the one or more user interfaces to a user device of the first company via the network, wherein the one or more user interfaces are displayed via a web browser or application disposed on the user device;

receive at least one company-specific email rule generated at the user device using the one or more user interfaces;

update the first email rule set based on the at least one company-specific email rule; and send at least a portion of the travel information to one or more third-party travel-related stakeholders associated with the first company via the network.

9. The system of claim 8, wherein the one or more third-party travel-related stakeholders associated with the first company comprise at least one of: an expense reporting service, a duty of care provider, a risk management provider, a price assurance manager, or a travel analytics service.

10. The system of claim 8, wherein the one or more user interfaces comprise at least one report generated using the travel information, the at least one report comprising at least one of: a travel expense report, a travel itinerary report, or an aggregate company employee travel report.

11. The system of claim 8, wherein to parse and filter each email message, the at least one processor is configured to parse and filter contents of a document attached to or referenced by the email message.

12. The system of claim 8, wherein the one or more user interfaces comprise an aggregate company employee travel report generated using the travel information.

13. The system of claim 8, wherein the at least one company-specific email rule is generated after a user inputs information about the at least one company-specific email rule at the user device.

14. The system of claim 8, wherein the travel information dashboard comprises a navigation ribbon and a data display area.

15. A non-transitory computer readable medium embodying a computer program, the computer program comprising computer readable program code for:

generating, by a server of a service provider, multiple email rule sets for multiple companies, wherein each email rule set enables an email server of each company to determine whether email messages processed by the email server include travel information associated with business travel of employees of that company, wherein each company is a client or customer of the service provider;

adapting, by the server of the service provider, a first one of the email rule sets based on a technical limitation of a first email platform, and adapting a second one of the email rule sets based on a technical limitation of a second email platform that is different from the first email platform;

sending, by the server of the service provider, the first email rule set to a first one of the companies and sending the second email rule set to a second one of the companies, wherein the first and second companies use different email platforms;

receiving, at the server of the service provider, each of multiple email messages from the email server of the first company via a network, wherein each email message is received after the email server determines, using the first email rule set, that the email message includes travel information associated with business travel of an employee of the first company;

parsing and filtering, by the server of the service provider, each email message to obtain the travel information;

storing, by the server of the service provider, the travel information in a data repository managed by the service provider;

generating, by the server of the service provider, one or more user interfaces associated with the travel information, wherein the one or more user interfaces are arranged as a travel information dashboard accessible to the first company;

sending, by the server of the service provider, the one or more user interfaces to a user device of the first company via the network, wherein the one or more user interfaces are displayed via a web browser or application disposed on the user device;

receiving, at the server of the service provider, at least one company-specific email rule generated at the user device using the one or more user interfaces;

updating, by the server of the service provider, the first email rule set based on the at least one company-specific email rule; and sending, by the server of the service provider, at least a portion of the travel information to one or more third-party travel-related stakeholders associated with the first company via the network.

16. The non-transitory computer readable medium of claim 15, wherein the one or more third-party travel-related stakeholders associated with the first company comprise at least one of: an expense reporting service, a duty of care provider, a risk management provider, a price assurance manager, or a travel analytics service.

17. The non-transitory computer readable medium of claim 15, wherein the one or more user interfaces comprise at least one report generated using the travel information, the at least one report comprising at least one of: a travel expense report, a travel itinerary report, or an aggregate company employee travel report.

18. The non-transitory computer readable medium of claim 15, wherein the one or more user interfaces comprise an aggregate company employee travel report generated using the travel information.

19. The non-transitory computer readable medium of claim 15, wherein the at least one company-specific email rule is generated after a user inputs information about the at least one company-specific email rule at the user device.

20. The non-transitory computer readable medium of claim 15, wherein the travel information dashboard comprises a navigation ribbon and a data display area.

* * * * *